(12) United States Patent
Balsubramanian

(10) Patent No.: US 8,078,799 B2
(45) Date of Patent: Dec. 13, 2011

(54) METHOD AND SYSTEM OF AN ADAPTIVE INPUT/OUTPUT SCHEDULER FOR STORAGE ARRAYS

(75) Inventor: Sridhar Balsubramanian, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 343 days.

(21) Appl. No.: 12/481,577

(22) Filed: Jun. 10, 2009

(65) Prior Publication Data

US 2010/0318736 A1 Dec. 16, 2010

(51) Int. Cl.
*G06F 12/00* (2006.01)

(52) U.S. Cl. ............ 711/114; 711/156; 711/158; 710/7; 710/15; 702/182

(58) Field of Classification Search .................. 711/114, 711/156, 158; 710/7, 15; 702/182
See application file for complete search history.

(56) References Cited

U.S. PATENT DOCUMENTS

| | | | | |
|---|---|---|---|---|
| 5,487,160 A * | 1/1996 | Bemis | | 711/114 |
| 7,197,577 B2 * | 3/2007 | Nellitheertha | | 710/6 |
| 7,281,086 B1 * | 10/2007 | More et al. | | 711/112 |
| 7,539,991 B2 * | 5/2009 | Leong et al. | | 718/102 |
| 7,926,059 B2 * | 4/2011 | Viswanathan et al. | | 718/102 |
| 2009/0222829 A1 * | 9/2009 | Leong et al. | | 718/102 |
| 2009/0300642 A1 * | 12/2009 | Thaler et al. | | 718/105 |
| 2010/0138569 A1 * | 6/2010 | Fuerst et al. | | 710/36 |

* cited by examiner

*Primary Examiner* — Stephen Elmore
(74) *Attorney, Agent, or Firm* — Prakash Nama; Global IP Services, PLLC

(57) ABSTRACT

An adaptive input/output (I/O) scheduler for storage arrays is disclosed. In one embodiment, a method of a redundant array of independent disks (RAID) controller for deploying an optimal I/O scheduler type per a storage array configuration includes generating performance data by assessing respective performances of a plurality of I/O scheduler types on different RAID level test volumes with at least one I/O pattern generated internally within a storage subsystem which comprises the RAID controller. The method also includes storing the associativeness of the performance data with respect to a particular I/O scheduler most suited for a given I/O workload to a nonvolatile memory of the RAID controller. The method further includes deploying an optimal one of the plurality of I/O scheduler types and at least one performance parameter for at least one subsequent I/O operation associated with the storage subsystem based on the performance data.

20 Claims, 5 Drawing Sheets

METHOD AND SYSTEM OF AN ADAPTIVE INPUT/OUTPUT SCHEDULER FOR STORAGE ARRAYS

FIELD OF TECHNOLOGY

Embodiments of the present invention relate to the field of storage systems. More particularly, embodiments of the present invention relate to redundant array of independent disks (RAID).

BACKGROUND

Input/output (I/O) scheduling may be a method employed by a redundant array of independent disks (RAID) controller to decide an order that I/O operations are submitted to a storage subsystem associated with the RAID controller. There are various types of I/O schedulers implemented in storage environments, such as a First-In-First-Out (FIFO), a Complete Fair Queuing (CFQ), an anticipatory scheduling, and a deadline scheduling.

However, the various types of I/O schedulers may lack native intelligence to learn configuration information of the storage subsystem, such as a storage volume type, a number of drives, a segment size, and handling aspects according to an incoming I/O block size and an I/O request type. Thus, the RAID controller may lack a mechanism to automatically select an optimal I/O scheduler for I/O operations performed to and from the storage subsystem. That is, an I/O scheduler may be manually assigned without a proper assessment of overall efficiency of the I/O operations when the storage subsystem is initialized, and the I/O scheduler may continue its operation without any interim assessment even when there is a change in configuration of the storage subsystem.

SUMMARY

A method and system of an adaptive input/output (I/O) scheduler for storage arrays is disclosed. In one aspect, a method includes generating performance data by assessing respective performances of a plurality of I/O scheduler types on different RAID level test volumes with one or more test I/O patterns generated internally within a storage subsystem with a redundant array of independent disks (RAID) controller. The method also includes storing the performance data and associativeness of the performance data with respect to a particular I/O scheduler type most suited for each of the test I/O patterns to a nonvolatile memory of the RAID controller. The method further includes deploying an optimal one of the plurality of I/O scheduler types and at least one performance parameter for at least one subsequent I/O operation associated with the storage subsystem based on the performance data and the associativeness.

In another aspect, a system in a RAID controller for deploying an optimal I/O scheduler type per a storage array configuration includes a processor, a first nonvolatile memory, and a second nonvolatile memory. The first nonvolatile memory is coupled to the processor and is configured for storing a set of instructions. The set of instructions, when executed by the processor, causes the processor to perform the method described above. Further, the second nonvolatile memory is coupled to the processor and is configured for storing performance data and associativeness of the performance data with respect to a particular I/O scheduler type for a given I/O workload on a specific storage array configuration.

The methods, apparatuses and systems disclosed herein may be implemented in any means for achieving various aspects, and other features will be apparent from the accompanying drawings and from the detailed description that follow.

BRIEF DESCRIPTION OF THE DRAWINGS

Various preferred embodiments are described herein with reference to the drawings, wherein:

FIG. 2 FIGS. 2A-B illustrates a process diagram of an exemplary adaptive I/O scheduler algorithm performed by the system of FIG. 1, according to one embodiment;

The drawings described herein are for illustration purposes only and are not intended to limit the scope of the present disclosure in any way.

DETAILED DESCRIPTION

A method and system of an adaptive input/output (I/O) scheduler for storage arrays is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "optimal" used herein simply means "best-suited" according to some metric. The terms "I/O fragmentation size" and "I/O fragmentation boundary" are used interchangeably throughout the document.

Figure 1:
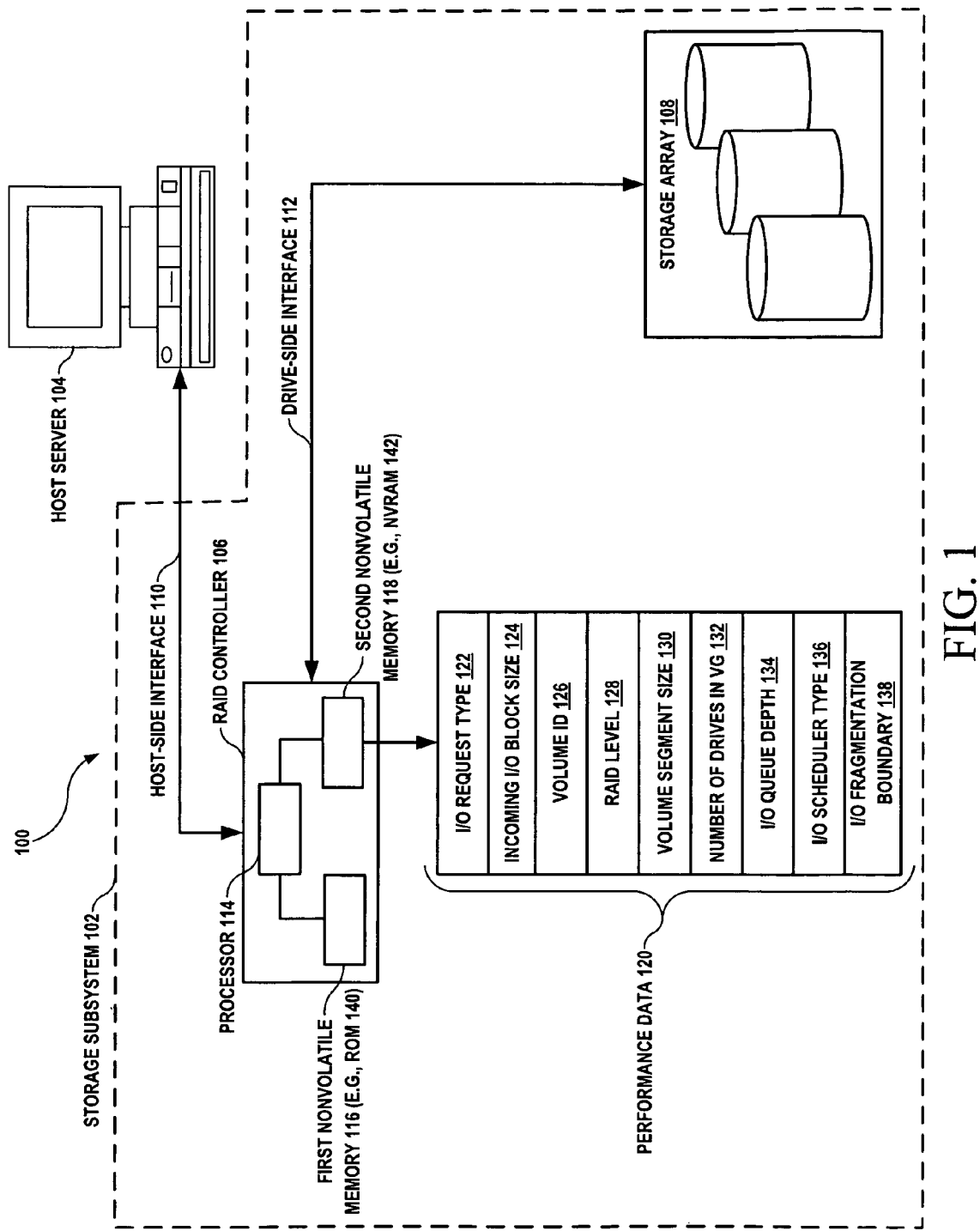
FIG. 1 illustrate an exemplary system for deploying an optimal input/output (I/O) scheduler type per a storage array configuration, according to one embodiment.

FIG. 1 illustrates an exemplary system 100 for deploying an optimal I/O scheduler type per a storage array configuration, according to one embodiment. As illustrated, the system 100 includes a storage subsystem 102 and a host server 104. The storage subsystem 102 includes a redundant array of independent disks (RAID) controller 106 and a storage array 108. The RAID controller 106 is coupled to the host server 104 via a host-side interface 110 (e.g., fiber channel (FC), internet small computer system interface (iSCSi), serial attached small computer system interface (SAS), etc.) for generating one or more I/O requests and conveying their responses. Further, the RAID controller 106 is also coupled to the storage array 108 via a drive-side interface 112 (e.g., FC, storage area network (SAS), network attached storage (NAS), etc.) for executing the one or more I/O request.

Further, the RAID controller 106 includes a processor 114, a first nonvolatile memory 116 (e.g., a read only memory (ROM) 140) and a second nonvolatile memory 118 (e.g., a nonvolatile random access memory (NVRAM) 142). The first nonvolatile memory 116 and the second nonvolatile memory 118 are coupled to the processor 114. The first nonvolatile memory 116 is configured for storing a set of instructions associated with an adaptive scheduler algorithm.

The second nonvolatile memory 118 is configured for storing associativeness of performance data 120 with respect to a particular I/O scheduler most suited for a given I/O pattern on a specific storage array configuration. The performance data 120 may be learnt data associated with one or more I/O operations and generated during a learn cycle. In one embodiment, the performance data 120 may be based on a lookup table which contains the data obtained by computing an I/O scheduler type best suited for a particular RAID level, a number of drives in a volume group (VG), an incoming I/O request type, and an incoming I/O block size as well as their associativeness. As illustrated, the performance data 120 includes an I/O request type 122, an incoming I/O block size 124, a volume identifier (ID) 126, a RAID level 128, a volume segment size 130, a number of drives in a volume group (VG) 132, an I/O queue depth 134, an I/O scheduler type 136, and an I/O fragmentation boundary 138.

In accordance with the above-described embodiments, the set of instructions, stored in the first nonvolatile memory 116, when executed by the processor 114, causes the processor 114 to perform a method for deploying an optimal I/O scheduler type per a storage array configuration. The method includes generating the performance data 108 associated with one or more I/O operations by running a learn cycle. In one embodiment, the learn cycle is run to assess respective performances of a plurality of I/O scheduler types on different RAID level test volumes.

The method further includes deploying an adaptive scheduler mode for I/O processing based on the associativeness of the performance data 120 with respect to a particular I/O scheduler for a given I/O workload. In one embodiment, an optimal one of the plurality of I/O scheduler types and a performance parameter(s) for subsequent I/O operations associated with the storage subsystem 102 are deployed for the I/O processing based on a pre-determined combination of the I/O scheduler types versus workload for optimum performance data 120. Although, the system 100 is described having a host server and a storage subsystem with a RAID controller and a storage array, one can envision that the system 100 may include a plurality of host servers and a storage subsystem with a plurality of RAID controllers coupled to a plurality of storage arrays to perform method described above.

Figure 2A:
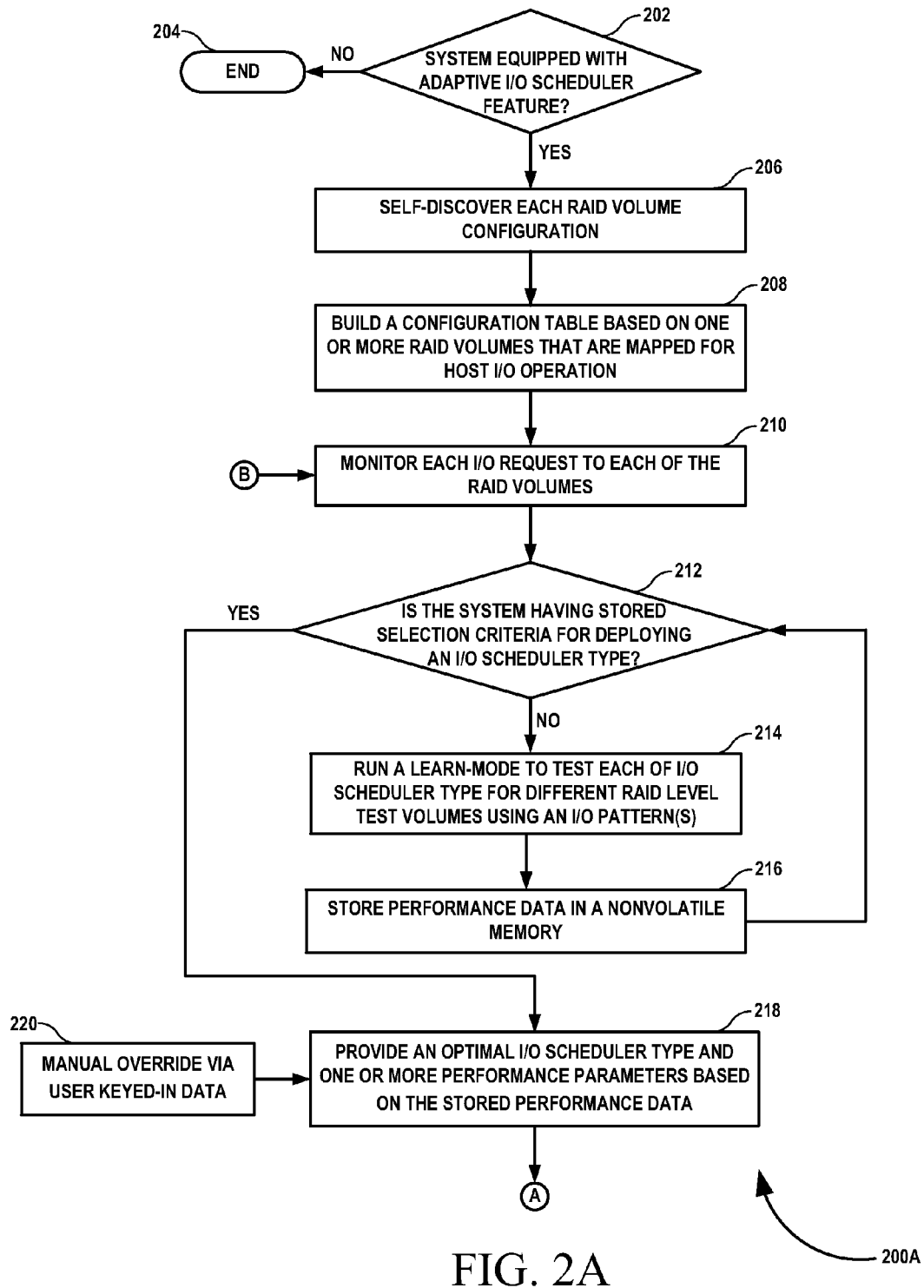
Figure 2B:
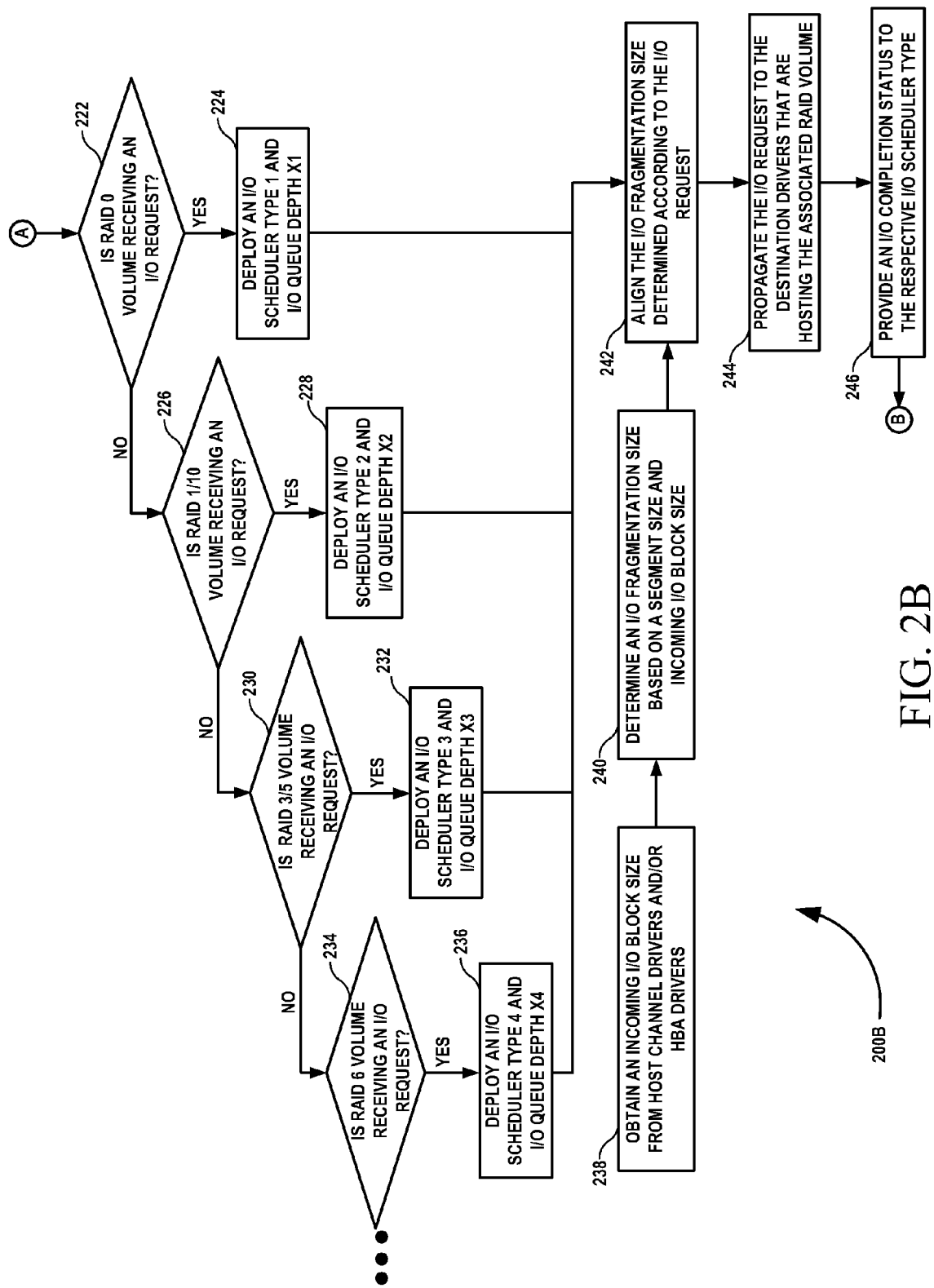

FIG. 2A illustrates a process diagram 200A of an exemplary adaptive I/O scheduler algorithm performed by the system 100 of FIG. 1, according to one embodiment. FIG. 2B illustrates a continuation process diagram 200B of FIG. 2A, according to one embodiment. In step 202, it is checked whether the system 100 is equipped with an adaptive I/O scheduler feature. If, in step 202, it is determined that the system 100 is equipped with the adaptive I/O scheduler feature, the process 200 performs step 206. Otherwise, the process 200 is terminated in step 204.

In step 206, a configuration (e.g., a RAID level, a stripe size, a RAID volume size, etc.) of each RAID volume is self-discovered. In one exemplary implementation, the RAID volume configuration is self-discovered by scanning said each RAID volume present in the storage subsystem 102. In step 208, a configuration table is built based on the discovered RAID volumes that are mapped for a host I/O operation. The configuration table includes a segment size, a RAID level, and a number of drives of each of the RAID volumes mapped for the host I/O operation.

In step 210, each I/O request to each of the one or more RAID volumes is monitored. In step 212, it is determined whether the system 100 is having stored pre-existing selection criteria (e.g., based on previously learnt associativeness of the performance data 120 with respect to a particular I/O scheduler for a given I/O workload) for deploying an I/O scheduler type. In other words, the step 212 is performed if the performance data 120 is void of comparable data for selecting one of available I/O scheduler types based on each I/O request and each of the RAID volumes. The I/O scheduler types may include a Random Scheduling (RSS), a First-In-First-Out (FIFO), a Last-In-Last-Out (LILO), a shortest seek first, an elevator algorithm, an N-Step-SCAN, a FSCAN, a Complete Fair Queuing (CFQ), an anticipatory scheduling, a No Operation Performed (NOOP) scheduler, and a deadline scheduler.

If, in step 212, the performance data 120 is determined as void, then step 214 is performed. Otherwise, step 218 is performed. In step 214, a learn-mode is run to test each of the I/O scheduler types for different RAID level test volumes using an I/O pattern(s). The I/O pattern(s) may be generated within the storage subsystem 102 and may include a plurality of I/O block sizes, a plurality of I/O request types and a plurality of queuing techniques. In one embodiment, step 214 may be performed when the storage subsystem 102 is initialized. In another embodiment, step 214 may be performed when the storage subsystem 102 is reconfigured.

In one embodiment, the I/O scheduler types are tested for assessing respective performances of each of the I/O scheduler types on the different RAID level test volumes. Based on assessment of the respective performances, performance data 120 (e.g., learned data) associated with one or more I/O operations is generated. Thus, the performance data 120 includes an optimal I/O scheduler type, an optimal queue depth, and an optimal I/O fragmentation size for each of said different RAID level test volumes, each of the plurality of I/O request types and each of the plurality of I/O block sizes. In one embodiment, the performance data 120 may be generated in a form of a lookup table such that the selection process for the optimal I/O scheduler type and the optimal performance parameters can be expedited. In step 216, the performance data and associativeness of the performance data with respect to a particular I/O scheduler type for a given I/O workload on a specific storage array configuration 120 is stored in the second nonvolatile memory 118 of the RAID controller 106. Then, the process 200 is routed back to step 212. Thus, the learning cycle is completed upon generating and storing the associativeness of the performance data with respect to a particular I/O scheduler type for a given I/O workload on a specific storage array configuration, and then an adaptive scheduler mode is deployed for I/O processing (e.g., by the RAID controller 106).

Once the adaptive scheduler mode is started, the optimal I/O scheduler type and one or more optimal performance parameters for a particular I/O operation are provided based on the performance data 120 (step 218). It is appreciated that the optimal I/O scheduler type and the optimal performance parameters may enable the best I/O operation for the storage subsystem (e.g., the storage subsystem 102 of FIG. 1) given the current configuration (e.g., RAID level volume(s), I/O pattern(s), etc.) of the storage subsystem. In one example embodiment, the process 200 performs step 218 based on a manual override via user-keyed in data (step 220). In the adaptive scheduler mode, each I/O request to respective one of the RAID volumes in the storage subsystem 102 is trapped and scanned to discover an incoming I/O request type (e.g., read/write operation, sequential/random operation, etc.) as discussed below.

In operation 222, it is determined whether a RAID 0 volume is receiving an I/O request. If the RAID 0 volume is receiving an I/O request, then the process 200 performs step 224, else the process 200 performs step 226. In step 224, an I/O scheduler type 1 and an I/O queue depth X1 are deployed and then step 242 is performed. In operation 226, it is determined whether a RAID 1 or RAID 10 volume is receiving an I/O request. If the RAID 1 or RAID 10 volume is receiving an I/O request, then the process 200 performs step 228, else the process 200 performs step 230. In step 228, an I/O scheduler type 2 and an I/O queue depth X2 are deployed and then step 242 is performed.

In operation 230, it is determined whether a RAID 3 or RAID 5 volume is receiving an I/O request. If the RAID 3 or RAID 5 volume is receiving an I/O request, then the process 200 performs step 232, else the process 200 performs step 234. In step 232, an I/O scheduler type 3 and an I/O queue depth X3 are deployed and then step 242 is performed. In operation 234, it is determined whether a RAID 6 volume is receiving an I/O request. If the RAID 6 volume is receiving an I/O request, then the process 200 performs step 236, else the process 200 continues to check for other RAID level volumes in the subsystem 102 receiving an I/O request. In step 236, an I/O scheduler type 4 and an I/O queue depth X4 are deployed and then step 242 is performed.

As illustrated, the process 200 performs step 242 upon performing steps 238 and 240. In step 238, an incoming I/O block size is obtained from host bus adapter (HBA) drives and/or host channel drives on the host server 136 for the storage subsystem 102. In step 240, an I/O fragmentation size is determined based on a segment size of the RAID volume and the incoming I/O block size. In step 242, the I/O fragmentation size is aligned according to the I/O request. In step 244, the I/O request is propagated to the destination drives hosting the associated RAID volume.

In step 246, an I/O request completion status is provided to the respective I/O scheduler type. Further, the process 200 is routed back to step 210 and is repeated till there are persisting incoming I/O requests to the storage subsystem 102. It can be noted that, a user of the system 200 can initiate a new learn cycle when there are configuration or I/O workload changes (e.g., via a new application deployment) within the storage subsystem 102.

Figure 3:
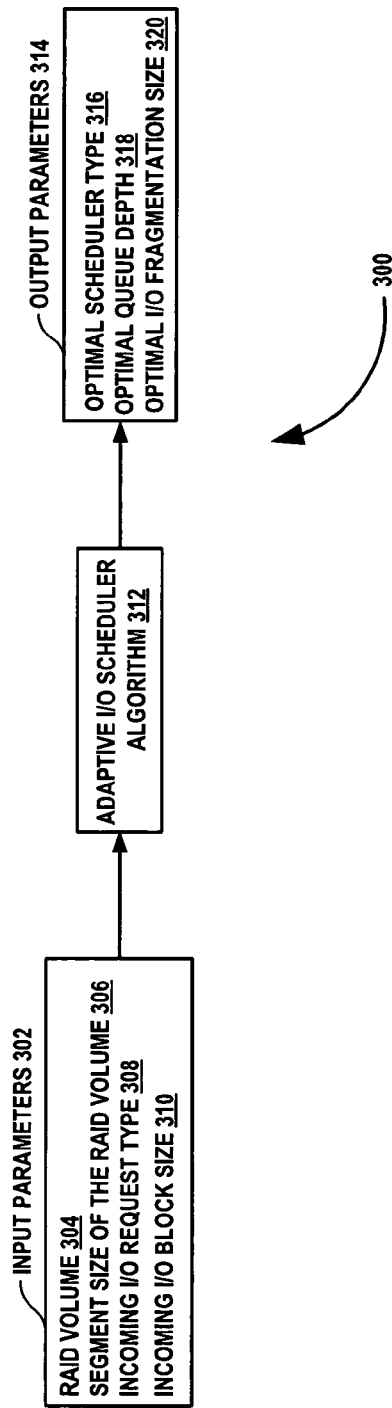
FIG. 3 illustrates a block diagram illustrating input and output parameters of the adaptive I/O scheduler algorithm, such as those shown in FIG. 2.

FIG. 3 illustrates a block diagram 300 illustrating input parameters 302 and output parameters 314 of an adaptive I/O scheduler algorithm 312 such as those shown in FIG. 2. The input parameters 302 are associated with a subsequent I/O operation and include a RAID volume 304, a segment size of the RAID volume 306, an incoming I/O request type 308, and an incoming I/O block size 310.

The adaptive I/O scheduler algorithm 312 applies the input parameters 302 to the performance data 120 to select an optimal I/O scheduler type 316, an optimal queue depth 318, and an optimal I/O fragmentation size 320 as the output parameters 314. In one embodiment, an optimal I/O scheduler type for one or more I/O operations is deployed per a storage array configuration based on the output parameters 314. It can be noted that, the adaptive scheduler algorithm 312 determines the I/O fragmentation size based on the incoming I/O block size 310. In one example embodiment, the incoming I/O block size 310 is reported by host channel drives or host HBA drives associated with the storage subsystem 102.

Figure 4:
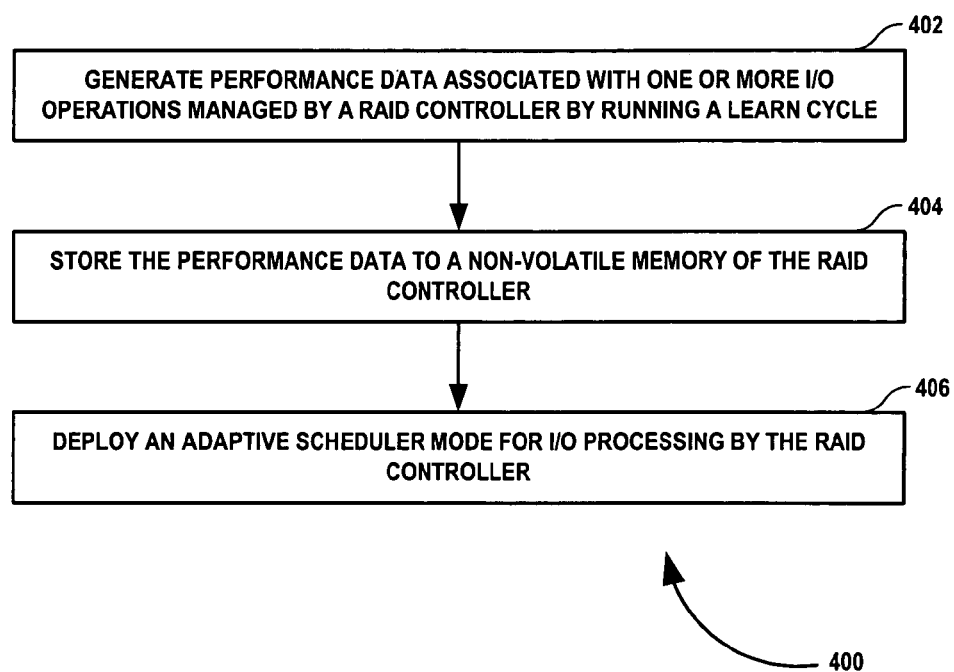
FIG. 4 illustrates a process flow chart of an exemplary method for deploying an optimal I/O scheduler type per a storage array configuration, according to one embodiment.

FIG. 4 illustrates a process flow chart of an exemplary method 400 for deploying an optimal I/O scheduler type per a storage array configuration, according to one embodiment. In operation 402, performance data associated with one or more I/O operations managed by a RAID controller is generated by running a learn cycle. For example, step 214 of FIG. 2 may be performed. In operation 404, the performance data and associativeness of the performance data with respect to a particular I/O scheduler for a given I/O workload on a specific storage array configuration is stored to a non-volatile memory of the RAID controller. For example, step 216 may be performed. In operation 406, an adaptive scheduler mode is deployed for I/O processing by the RAID controller. For example, steps 218 through 242 may be performed.

Moreover, in one example embodiment, a computer readable medium for deploying an optimal I/O scheduler type per a storage array configuration has instructions that, when executed by a computer, cause the computer to perform the method illustrated in FIG. 4.

In various embodiments, the methods and systems described in FIGS. 1-4 enables instantaneous selection and deployment of an optimal I/O scheduler type, an optimal queue depth, and an I/O fragmentation boundary per a storage array configuration. This may be achieved based on a pre-learnt set of data (e.g., performance data) generated during a learn cycle injecting workload within a storage subsystem. This helps increase overall efficiency of I/O operation and reduce I/O latency. Thus, the above-described system enables building of storage intelligence within an I/O scheduler scheme to select an optimal I/O scheduler type based on an application workload.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuit (ASIC)).

What is claimed is:

1. A method of a redundant array of independent disks (RAID) controller for deploying an optimal input/output (I/O) scheduler type per a storage array configuration, comprising:
generating performance data by assessing respective performances of a plurality of I/O scheduler types on different RAID level test volumes with at least one I/O pattern generated internally within a storage subsystem which comprises the RAID controller;
storing the performance data and an associativeness of the performance data with respect to the plurality of I/O scheduler types on the different RAID level test volumes with the at least one I/O pattern to a nonvolatile memory of the RAID controller; and
deploying an optimal one of the plurality of I/O scheduler types and at least one performance parameter for at least one subsequent I/O operation associated with the storage subsystem based on the performance data and the associativeness.

2. The method of claim 1, wherein the plurality of I/O scheduler types comprise a Random Scheduling (RSS), a First-In-First-Out (FIFO), a Last-In-Last-Out (LILO), a shortest seek first, an elevator algorithm, an N-Step-SCAN, a FSCAN, a Complete Fair Queuing (CFQ), an anticipatory scheduling, a No Operation Performed (NOOP) scheduler, and a deadline scheduler.

3. The method of claim 1, wherein the generating the performance data is performed when the storage subsystem is initialized or when the storage subsystem is reconfigured.

4. The method of claim 1, wherein the generating the performance data comprises:
scanning each RAID volume present in the storage subsystem to discover a respective configuration of said each RAID volume;
generating a configuration table based on at least one RAID volume in the storage subsystem mapped for a host I/O operation;
monitoring each I/O request to each of the at least one RAID volume; and testing each of the plurality of I/O scheduler types for the different RAID level test volumes using the at least one I/O pattern when the performance data is void of comparable data for selecting one of the plurality I/O scheduler types according to said each I/O request and said each of the at least one RAID volume.

5. The method of claim 4, wherein the configuration table comprises a segment size, a RAID level, and a number of drives of said each RAID volume.

6. The method of claim 4, wherein said each I/O request is trapped and scanned to discover an incoming I/O request type which comprises a read/write operation and a sequential/random operation.

7. The method of claim 1, wherein the at least one I/O pattern comprises a plurality of I/O block sizes, a plurality of I/O request types, and a plurality of queuing techniques.

8. The method of claim 7, wherein the performance data comprises an optimal I/O scheduler type, an optimal queue depth, and an optimal I/O fragmentation size for each of said different RAID level test volumes, each of the plurality of I/O request types, and each of the plurality of I/O block sizes.

9. The method of claim 1, wherein the deploying the optimal one of the plurality of scheduler types and the at least one performance parameter comprises selecting an optimal I/O scheduler type, an optimal queue depth, and an optimal I/O fragmentation size by applying a plurality of input parameters associated with the at least one subsequent I/O operation to the performance data.

10. The method of claim 9, wherein the plurality of input parameters comprises a type of a RAID volume, a segment size of the RAID volume, an incoming I/O request type, and an incoming I/O block size associated with the at least one subsequent I/O operations.

11. The method of claim 10, wherein the optimal I/O fragmentation size is determined based on the incoming I/O block size reported by host channel drives or host bus adapter (HBA) drives associated with the storage subsystem.

12. The method of claim 11, wherein the incoming I/O block size is obtained from at least one HBA drive on a host server for the storage subsystem.

13. A system in a redundant array of independent disks (RAID) controller for deploying an optimal I/O scheduler type per a storage array configuration, comprising:
a processor; and
a first nonvolatile memory coupled to the processor and configured for storing a set of instructions, when executed by the processor, causes the processor to perform a method comprising:
generating performance data by assessing respective performances of a plurality of I/O scheduler types on different RAID level test volumes with at least one I/O pattern generated internally within a storage subsystem which comprises the RAID controller; and
deploying an optimal one of the plurality of I/O scheduler types and at least one performance parameter for at least one subsequent I/O operation associated with the storage subsystem based on the performance data; and
a second nonvolatile memory coupled to the processor for storing the performance data and an associativeness of the performance data with respect to the plurality of I/O scheduler types for the different RAID level test volumes with the at least one I/O pattern.

14. The system of claim 13, wherein the performance data comprise an I/O request type, an incoming I/O block size, a volume identifier (ID), a RAID level, a volume segment size, a number of drives in each volume group (VG), an I/O queue depth, an I/O scheduler type, and an I/O fragmentation boundary.

15. The system of claim 13, wherein the first nonvolatile memory comprises a read only memory (ROM).

16. The system of claim 13, wherein the second nonvolatile memory comprises a nonvolatile random access memory (NVRAM).

17. The system of claim 13, wherein the RAID controller is coupled to a host server for generating at least one I/O request.

18. The system of claim 17, wherein the RAID controller is coupled to a storage array for executing the at least one I/O request.

19. A computer readable medium for deploying an optimal input/output (I/O) scheduler type per a storage array configuration having instructions that, when executed by a computer, cause the computer to perform a method comprising:
generating performance data by assessing respective performances of a plurality of I/O scheduler types on different redundant array of independent disks (RAID) level test volumes with at least one I/O pattern generated internally within a storage subsystem which comprises the RAID controller;
storing the performance data and an associativeness of the performance data with respect to the plurality of I/O scheduler types for the different RAID level test volumes with the at least one I/O pattern to a nonvolatile memory of the RAID controller; and
deploying an optimal one of the plurality of I/O scheduler types and at least one performance parameter for at least one subsequent I/O operation associated with the storage subsystem based on the performance data and the associativeness.

20. The computer readable medium of claim 19, wherein the generating the performance data comprises:
scanning each RAID volume present in the storage subsystem to discover a respective configuration of said each RAID volume;
generating a configuration table based on at least one RAID volume in the storage subsystem mapped for a host I/O operation;
monitoring each I/O request to each of the at least one RAID volume; and
testing each of the plurality of I/O schedulers for the different RAID level test volumes using the at least one I/O pattern when the performance data is void of comparable data for selecting one of the plurality I/O scheduler types according to said each I/O request and said each of the at least one RAID volume.

* * * * *